United States Patent
Skoog et al.

(10) Patent No.: US 6,441,810 B1
(45) Date of Patent: Aug. 27, 2002

(54) TELEMETRY ENCODING TECHNIQUE FOR SMART STYLUS

(75) Inventors: Steven K. Skoog; Gregory A. Tabor, both of Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 1190 days.

(21) Appl. No.: 08/551,303

(22) Filed: Oct. 31, 1995

(51) Int. Cl.[7] ............................................... G09G 5/00
(52) U.S. Cl. .................. 345/179; 178/19.01; 178/19.03
(58) Field of Search .................................. 345/179, 173, 345/174, 175, 180, 181, 182, 183; 178/18–20, 87, 18.01, 18.02, 18.03, 18.07, 19.01, 19.03, 20.03

(56) References Cited

U.S. PATENT DOCUMENTS

| | | | |
|---|---|---|---|
| 4,748,446 A | | 5/1988 | Hayworth .................... 340/825 |
| 5,007,085 A | | 4/1991 | Greanias et al. .............. 380/25 |
| 5,373,118 A | * | 12/1994 | Watson ........................ 178/18 |
| 5,411,536 A | | 5/1995 | Armstrong .................... 607/32 |
| 5,414,227 A | | 5/1995 | Schubert et al. .............. 178/18 |
| 5,478,976 A | * | 12/1995 | Kano .......................... 178/19 |
| 5,525,981 A | * | 6/1996 | Abernethy .................... 178/18 |
| 5,608,390 A | * | 3/1997 | Gasparik ...................... 178/19 |

OTHER PUBLICATIONS

Error–Correcting Codes with Application to Digital Storage Systems; Dr. E.J. Weldon, Jr.; Jul. 23–26, 1990; Santa Barbara, CA.

* cited by examiner

Primary Examiner—Lun-Yi Lao

(57) ABSTRACT

The invention relates to the transmission of telemetry data from a stylus to a host computer via a serial, asynchronous data channel. The telemetry data is encoded into code-words using a specially selected error detecting or error correcting code, the code-words are transmitted from the stylus in a continuous, homogeneous data stream without the use of framing delimiters between adjacent code-words, and the code-words are then received by the host computer which separates the code-words according to the unique characteristics of the selected code. The code may be chosen based on both the error detection/correction requirements of the system and the probability that the code will create invalid intermediate code matches between consecutive back-to-back code-words. In one embodiment, the invention provides a synchronization scheme which greatly reduces the probability that invalid intermediate code matches will be recognized in the host computer as validly transmitted code-words.

18 Claims, 5 Drawing Sheets

TELEMETRY ENCODING TECHNIQUE FOR SMART STYLUS

FIELD OF THE INVENTION

The invention relates generally to data encoding and transmission and, more specifically, to a method and apparatus for generating and delivering encoded data between a stylus and a host computer system.

BACKGROUND OF THE INVENTION

Many computer systems now make use of an input device known as a stylus. A stylus is a pointing device which an operator can utilize to indicate a specific location, such as a position on a CRT screen, LCD screen, or a graphics tablet, to a host computer system. A stylus can be used, for example, to select one of a number of options being displayed on a computer monitor or to input handwritten data into a computer. In this regard, a stylus must have some way of indicating its position to a host computer system.

In addition to position information, a stylus should be capable of transferring other types of data, known as telemetry data, to a host computer. Telemetry data can be very important in the performance of applications by a host computer system. For example, one type of telemetry data which may be transferred from a stylus to a host computer is tip switch position. As its name implies, a tip switch is an electrical switch coupled to the tip of a stylus. When the stylus tip touches a surface, such as a CRT screen, the tip switch may open or close, depending on how the switch is configured. The host computer can use this tip switch position information, in conjunction with the stylus position information, to perform any number of different applications. For example, in an application where a user selects an option from a computer display, the host computer can compute the stylus position at the instant when the tip switch changed position to determine which option on the computer display was selected. As is apparent, it is very important that the telemetry data be accurately transferred from the stylus to the host computer so that mistakes are not made in the performance of applications.

A need therefore exists for a method and apparatus for accurately delivering telemetry data from a stylus to a host computer.

SUMMARY OF THE INVENTION

The invention provides a method and apparatus for accurately delivering telemetry data from a stylus to a host computer via a serial, asynchronous data channel. The telemetry data may include, for example, tip switch position, barrel switch position, battery condition, stylus identification, tip switch pressure, and any other information the host computer may need from the stylus to perform a particular application. Within the stylus, the telemetry data is encoded into code-words using a specially selected error detecting or error correcting code. The code-words are then transmitted from the stylus to the host computer in a continuous, homogeneous data stream without the use of framing delimiters between successive code-words. The continuous, homogeneous data stream is received by the host computer which separates the code-words according to the unique characteristics of the selected code. The code-words may then be decoded and used by the host computer in the performance of applications.

The lack of framing delimiters in the continuous, homogeneous data stream is important in systems which perform integration on the data stream when received in the host computer. This is because the integration function generally requires a DC balanced signal and framing delimiters tend to destroy DC balance. For example, one type of framing delimiter commonly used is a relatively long interval of idle time between data packets. This period of idle time can greatly affect the DC balance of the transmitted data stream and is therefore undesirable. The lack of framing delimiters, however, creates problems in accurately separating validly transmitted code-words once the data stream is received by the host computer. This is because noise, or the code-words themselves, may result in bit strings in the data stream, known as invalid intermediate matches, which match valid code-words but which are not actual code-words validly transmitted from the stylus. If the host computer recognizes these invalid intermediate matches as validly transmitted code-words, serious complications may arise in the performance of applications. Therefore, in one embodiment, the invention provides a synchronization scheme which greatly reduces the probability that invalid intermediate code matches in the continuous data stream will be recognized in the host computer as valid code-words.

In choosing a code in accordance with the present invention, one concern is that the code contain a level of redundancy sufficient to detect or correct most of the errors which will occur in the system. Another concern is that the code have zero, or a relatively low, probability of creating invalid intermediate code matches between back-to-back code-words. Using these two criteria, a code can be selected which provides a very low incidence of invalid intermediate matches being detected in the host computer. In the preferred embodiment of the present invention, each code-word is 21 bits long and includes a 10-bit data portion, containing the telemetry data, and an 11-bit code portion. To create the 21-bit code-word, the 10-bit data portion is first encoded using a shortened (23,12) Golay code. The resulting bit string is then appended to the end of the 10-bit data portion to create a 21-bit word. The 11-bit Golay coded portion of the word is then inverted in every bit position except the second to last to create the 21-bit code-word.

Before the code-words are transmitted from the stylus, they may be subjected to further coding, such as run-length-limited (RLL) coding, to ensure that the transmitted signal contains enough timing information for effective synchronization within the host computer. This additional coding can also provide DC balance to the transmitted signal, which, as described above, is important when receiving circuitry is used which performs mathematical integration on the received signal. In the preferred embodiment, Manchester encoding is used to provide both timing information and DC balance to the transmitted signal.

Transmission of the code-words from the stylus to the host computer may be by any known method of data transmission. In the preferred embodiment of the present invention, the code-words are used to modulate an RF signal in the stylus and are then delivered to the host computer, at least in part, by RF link. Because RF transmission is relatively noisy, systems using this form of transmission greatly benefit from the invention's ability to reject invalid intermediate matches and to detect or correct errors in the transmitted code-words. It should be understood, however, that other forms of data transmission may also be used with the present invention, such as transmission by electrical wire.

After the continuous stream of code-words is received by the host computer, circuitry internal to the host computer separates the code-words from one another based on the characteristics of the chosen code. In other words, the framing of the code-words is "implied" in the chosen code. In one embodiment of the present invention, the host computer includes code checking circuitry which monitors the continuous stream of code-words to detect the occurrence of bit strings which match valid code-words. These detected bit strings are then separated by the host computer and treated as code-words validly transmitted from the stylus. This separation scheme produces adequate results if the code being used has no (or an extremely low) probability of creating invalid intermediate matches between back-to-back code-words and the transmission method is not very noisy. However, some codes will have a much higher probability of creating invalid intermediate matches and therefore require additional processing of the continuous stream of code-words before it is determined that validly transmitted code-words have been detected. In addition, any bit errors which occur in the transmission of the continuous stream of code-words to the host computer may increase the occurrence of invalid intermediate matches in the data stream. Therefore, in another embodiment of the present invention, the host computer further includes synchronization circuitry for reducing the probability that an invalid intermediate match in the continuous stream of code-words will be recognized in the host computer as a validly transmitted code-word.

The synchronization circuitry monitors the bit string matches detected by the code checking circuitry. Using this information, the synchronization circuitry qualifies a detected bit string (i.e., treats the bit string as a validly transmitted code-word) only if a predetermined number of code matches occur back-to-back in the input data stream. If this occurs, the synchronization circuitry then instructs the code checking circuitry to check the continuous data stream for code matches only at regular intervals equal to the length of a code-word. In this way, the probability of detecting an invalid intermediate match and treating it as a validly transmitted code-word is greatly reduced.

It should be appreciated that the present invention may be implemented in any data transmission system where data packets are transmitted back-to-back with no framing delimiters in a relatively noisy channel. Other objects and advantages of the present invention will be apparent from the following description.

DETAILED DESCRIPTION

The invention relates to a method and apparatus for accurately transferring telemetry data from a stylus to a host computer system via a serial, asynchronous data channel. The invention provides a unique coding and detection scheme which allows code-words to be transmitted back-to-back in a continuous, homogenous data stream without the use of framing delimiters between consecutive code-words. After reception of the data stream in the host computer, the code-words are separated from one another based on the unique characteristics of the chosen code. To enhance the accuracy of the code-word separation process and to reject invalid code-words, an extended frame synchronization methodology may be implemented. The invention has particular application in systems which require a DC balanced signal to be transmitted to the host computer. As defined herein, a continuous stream of packets means a stream of packets without any framing information between packets. A continuous, uninterrupted stream of back-to-back packets means a plurality of packets without any framing information therebetween.

Figure 1:
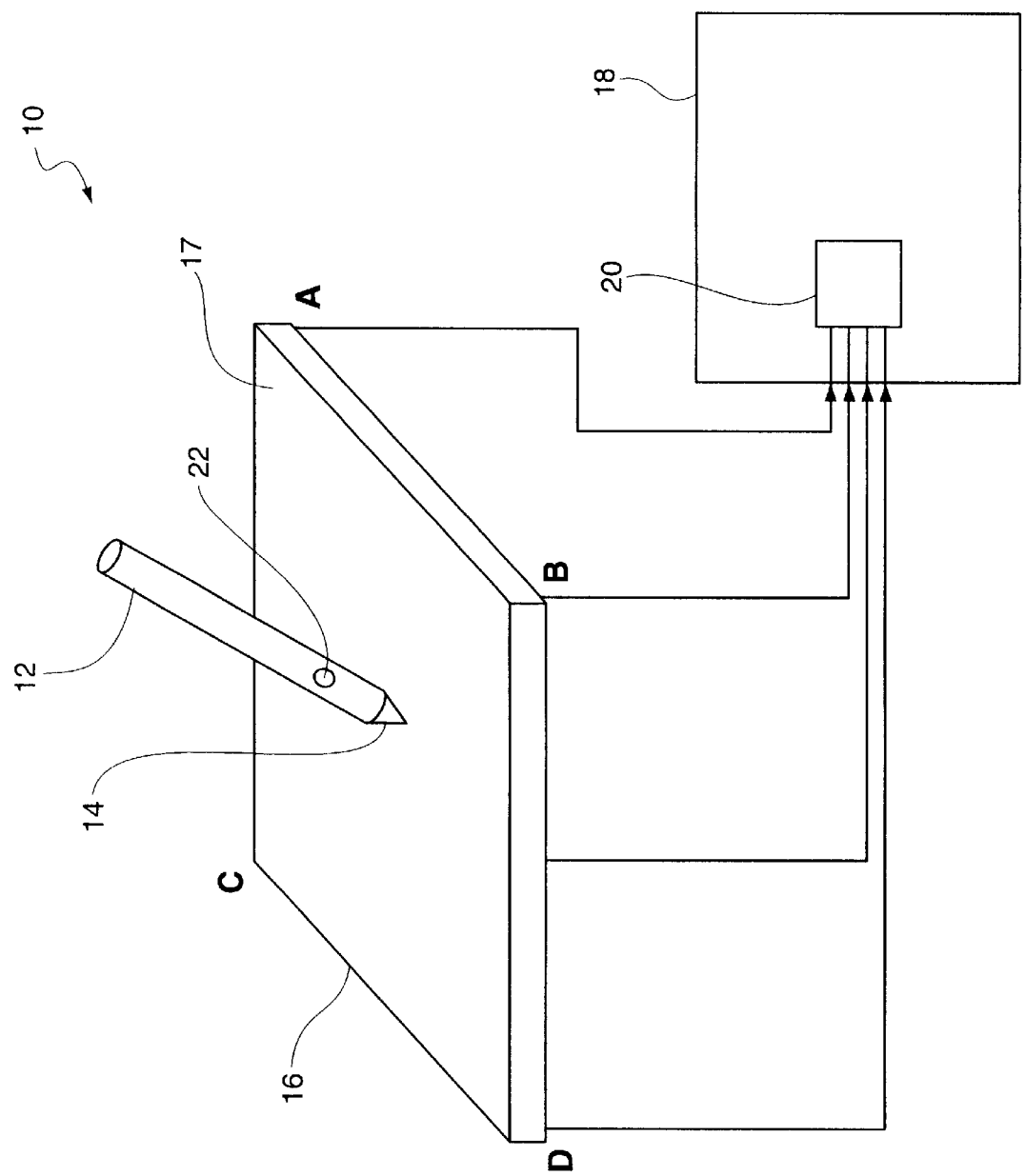
FIG. 1 is a perspective view of a computer system configured in accordance with the present invention.

FIG. 1 illustrates a computer system which may implement the present invention. For convenience, the system of FIG. 1 will be referred to by reference numeral 10. The system 10 includes: a stylus 12 having a stylus tip 14; a graphics tablet 16 having an upper surface 17 coated with a resistive material and four corners A, B, C, D; and a host computer 18. The stylus 12 emits a radio frequency (RF) signal from the stylus tip 14 which is picked up by the resistive coating of surface 17 when the stylus tip is brought near the graphics tablet 16. This RF signal creates a current in the surface 17 of the tablet 16 which flows outward from the location of the stylus tip 14 toward the four corners A, B, C, D. At the corners, the current is divided between four conductors which are each coupled to an integrated circuit 20 internal to the host computer 18. The amplitude of the current in each respective conductor, depends on the distance the current had to flow through the resistive coating of the tablet 16. The integrated circuit 20, in addition to other functions, compares the amplitudes of the currents from the four conductors to determine the location of the stylus tip 14 on the surface 17 of the graphics tablet 16. The integrated circuit 20 may perform an integration on the current signals as part of the comparison process. It should be appreciated that the graphics tablet 16 of system 10 may comprise a separate stand alone unit, an overlay for a computer monitor, or any other device which is capable of receiving an RF signal from a stylus and creating reference signals, using the RF signal, indicating the location of the stylus tip.

Figure 2:
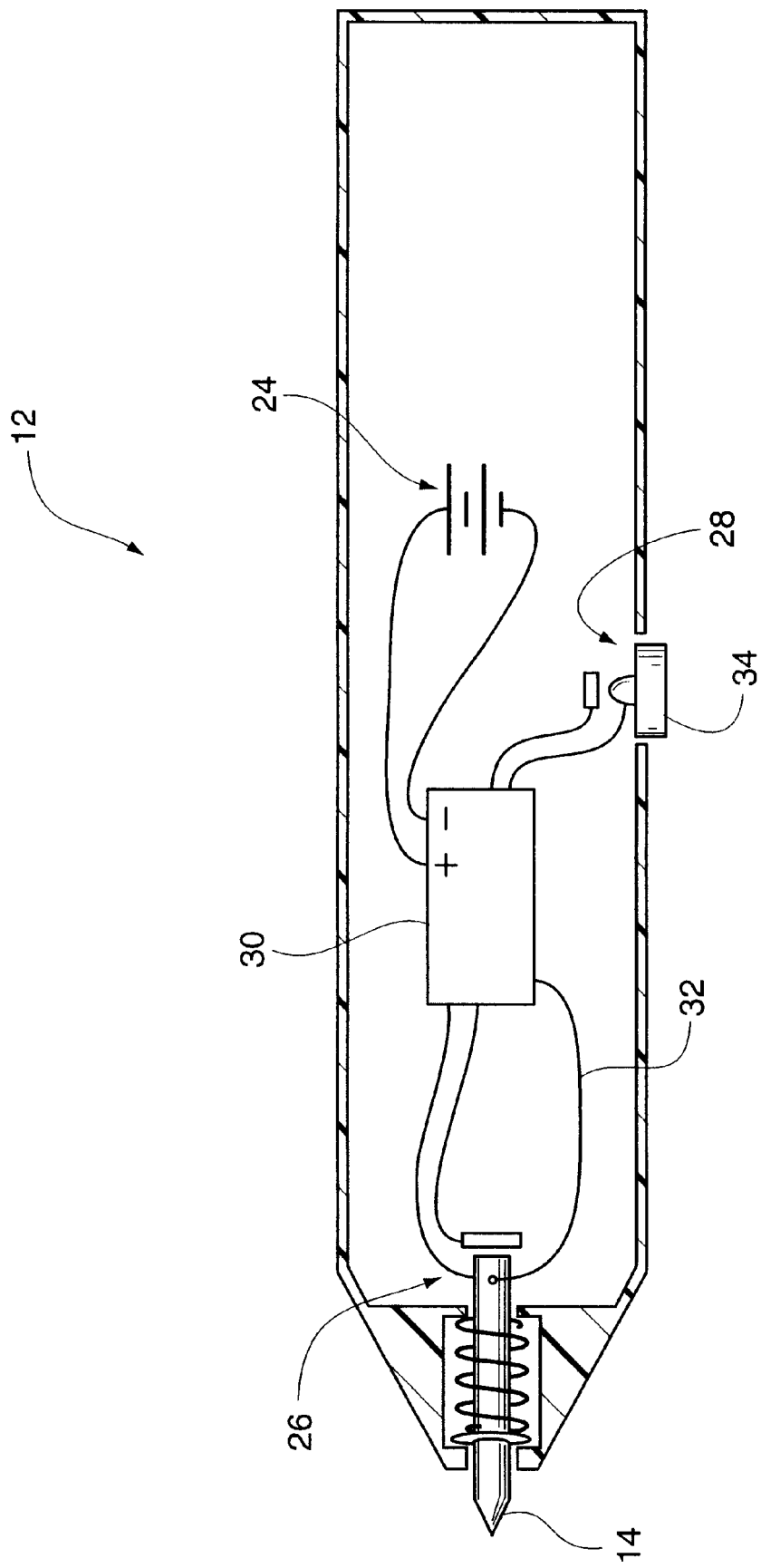
FIG. 2 is a cut away view of a stylus which may be used in one embodiment of the present invention.

The stylus 12 of FIG. 1 comprises a cordless, self-contained unit which an operator can use like a pencil. As illustrated in FIG. 2, in addition to the stylus tip 14, the stylus 12 may also include, for example: a battery 24, a tip switch 26, a barrel switch 28, and internal circuitry 30. The battery 24 is coupled to the internal circuitry 30 for, among other things, providing a source of electrical power to the circuitry 30. The tip switch 26 is coupled to the internal circuitry 30 for delivering a signal to the circuitry 30 indicative of whether the stylus tip 14 is touching the surface 17 of the tablet 16. This information may be needed by the host computer 18 to perform a particular application. The barrel switch 28 is also coupled to the internal circuitry 30 and creates a signal indicative of whether a user has applied pressure to an external plunger 34. This information may also be needed by the host computer.

The internal circuitry 30 of the present invention is operative for creating the RF signal which is emitted by the stylus tip 14. In addition to its use in determining stylus location, the RF signal is also operative for transmitting telemetry data to the host system 18. This telemetry data may include, for example, tip switch position, barrel switch position, and stylus battery condition. The RF signal is delivered to the stylus tip 14 via conductor 32 and transmitted from the stylus tip 14, which acts like an antenna. If the stylus tip 14 is near but not touching the graphics tablet 16, the RF signal will travel through the air and induce a current into the surface 17 of the tablet 16 as described previously. Alternatively, the stylus tip 14 may be brought into contact with the surface 17 of the tablet 16, in which case an RF current will flow directly from the tip 14 into the tablet surface 17.

The stylus 12 can be used to perform any number of different applications in conjunction with the graphics tablet 16 and the host computer 18. For example, in one application, a user may utilize the stylus 12 to enter handwritten information into the host computer 18 by "writing" the data on the graphics tablet 16 with the stylus tip 14. A special card within the host 18 can then be used to decipher the handwritten message and to convert it to a computer useable form. In another application, the stylus 12 may be used as a pointing device to point to a specific location on the screen of a computer monitor having a resistive overlay. For example, the host computer 18 may prompt a user to choose one of a number of options being displayed on the computer monitor. The user can then respond to the host 18 by touching the desired option with the stylus tip 14. The host computer 18 can then calculate the position of the stylus tip 14 at the time when the tip switch 26 was closed to determine which option was selected. In yet another application, the stylus may be used to draw on the screen of a computer monitor having a resistive overlay. As the user draws on the screen, the host computer 18 monitors the location of the stylus tip 14 and the position of the tip switch and illuminates the pixels that are traversed by the tip 14. Many other applications are also possible.

Figure 3:
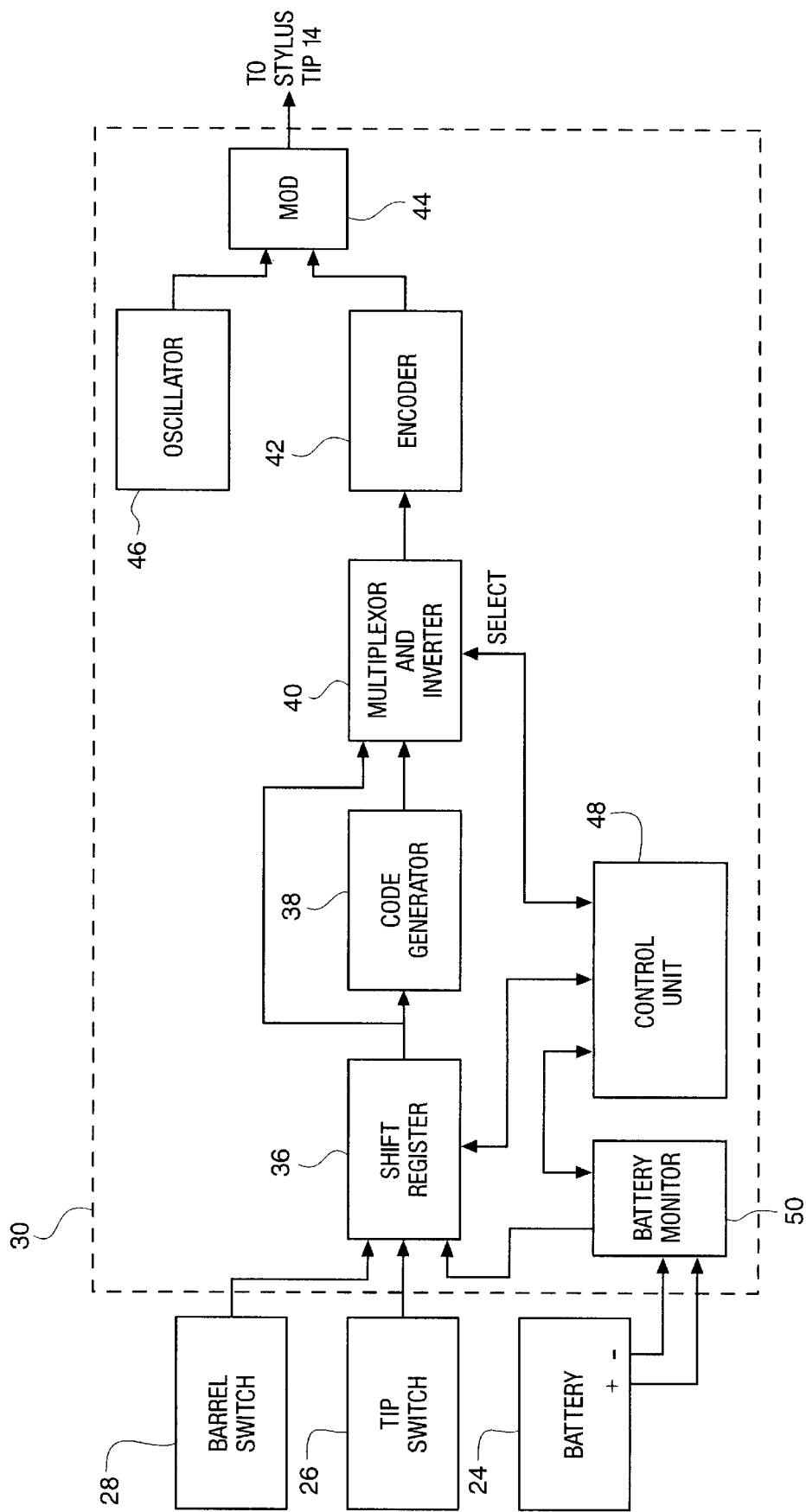
FIG. 3 is a block diagram illustrating one embodiment of the internal circuitry 30 of the stylus of FIG. 2 configured in accordance with the present invention.

FIG. 3 is a block diagram illustrating one embodiment of the internal circuitry 30 of the stylus 12 of FIG. 2. As seen in FIG. 3, the internal circuitry 30 may include: a shift register 36, a code generator 38, a multiplexor and inverter unit (MIU) 40, an encoder 42, a modulator 44, an oscillator 46, a control unit 48, and a battery monitor 50. The battery monitor 50 monitors the condition of the battery 24 of the stylus 12 and outputs a signal indicative of such. The shift register 36 is operative for receiving the output signals from the barrel switch 28, the tip switch 26, and the battery monitor 50 and for combining these signals into a single digital output signal. The code generator 38 receives the output signal from the shift register 36 and encodes the signal with an error detecting or error correcting code which is specially chosen in accordance with the present invention and which will be described in more detail later. The code generator 38 outputs a stream of back-to-back code-words, each of a predetermined length.

The MIU 40 receives both the digital output signal from the shift register 36 and the stream of code-words from the code generator 38 and passes one of the two signals to an output port based on the state of an input select signal from the control unit 48. If the output of the code generator is chosen, the MIU 40 also performs an inversion function on the chosen signal before allowing it to pass. The encoder 42 receives the chosen signal from the MIU 40 and applies Manchester, or similar, encoding to the signal. The Manchester encoded signal is then used to modulate an RF carrier signal, using modulator 44 and oscillator 46, and the resultant modulated RF signal is delivered to the stylus tip 14 which transmits the signal to the tablet 16 in a continuous, homogeneous stream of back-to-back code-words having no framing delimiters. The control unit 48 controls the operation of the battery monitor 50, the shift register 36, and the MIU 40.

In the preferred embodiment of the present invention, the shift register 36 outputs 10-bit digital data words containing the telemetry data to be delivered to the host system 18. In general, the telemetry data is derived from other circuitry within the stylus 12. For example, in the preferred embodiment of the present invention, each 10-bit data word includes one-bit (bit 7) indicating the condition of the stylus battery 24, one-bit (bit 6) indicating the position of the barrel switch 28, and one-bit (bit 5) indicating the position of the tip switch 26. The other bit positions of the 10-bit data word may be left unused or may include other telemetry information such as stylus identification or tip switch pressure. The other bit positions may also include one or more parity bits to provide an alternative coding scheme to the one produced by the code generator 38, should such a need arise. If the alternative coding scheme needs to be used, the control unit 48 will instruct the MIU 40 to select the output of the shift register 36, rather than the output of the code generator 38, to pass to the encoder 42.

Figure 4:
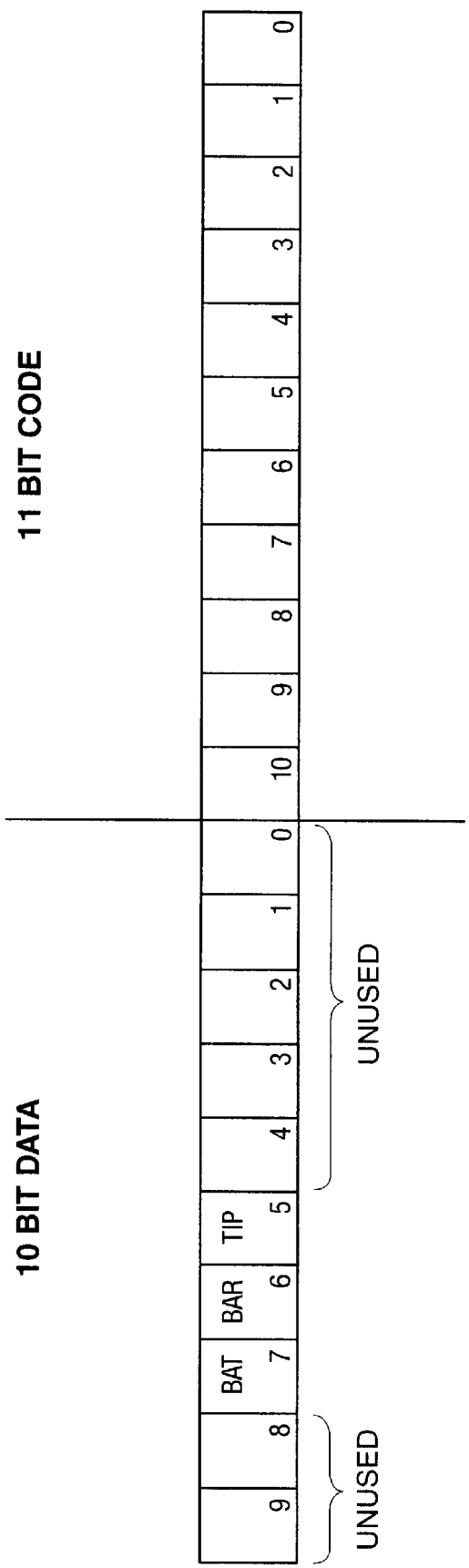
FIG. 4 is a graphical representation of the 21-bit code word used in the preferred embodiment of the present invention.

As described previously, the code generator 38 receives the output of the shift register 36 and encodes it. In the preferred embodiment of the present invention, the code generator 38 creates a 21-bit code-word having a data structure as illustrated in FIG. 4. The 21-bit code-word includes both a 10-bit data portion, which represents the 10-bit data word input from the shift register 36, and an 11-bit code portion which is added by the code generator 38. The coding scheme used by the code generator is a specially selected error detecting or error correcting code which allows code-words to be transmitted from the stylus 12 to the host computer 18 in a continuous, homogenous data stream without any framing delimiters between adjacent code-words and then accurately separated once received by the host computer 18. After separation of the code-words, bit errors caused during transmission of the code-words can be detected/corrected using the code portion of the separated code-words.

In selecting a coding scheme in accordance with the present invention, a main concern is limiting the production of invalid intermediate matches between back-to-back code-words. In other words, when any two valid code-words are placed back-to-back, it is desirous that none of the bit sequences formed between the two words represent a valid code-word. In practice, it is difficult to find a coding scheme which is capable of adequately performing an error detection/correction function and which produces no invalid intermediate matches between back-to-back code-words, so code selection usually centers around minimizing the probability of invalid intermediate matches for a given error detection/correction capability.

In the preferred embodiment of the present invention, a shortened (23,12) Golay code is implemented in the code generator 38. This Golay code may be realized using, for example, well known linear feedback shift register (LFSR) circuitry implementing a $5343_8$ (octal) generator polynomial. After Golay coding, the code-words are subjected to a $3775_8$ (octal) inversion in the MIU 40 to further reduce the probability of forming invalid intermediate code matches between adjacent code-words. This inversion comprises inverting every bit of the 11-bit code portion of the 21-bit code-word except the second to last bit (bit 1 in FIG. 4). It should be appreciated that the above coding scheme was arrived at empirically by considering a large number of different error detecting codes and determining which code produced the most desirable invalid intermediate match probabilities. No general relationship is known for generating codes to be used in the present invention.

Assuming error free data transmission between the stylus 12 and the host computer 18, the above coding scheme completely eliminates the occurrence of invalid intermediate code matches between identical back-to-back code-words. The coding scheme also reduces the probability of creating invalid intermediate code matches between two different back-to-back code-words to 0.7%. In addition, the coding scheme allows the detection of up to 6 bit errors in each 21-bit code-word transmitted from the stylus 12 to the host computer 18. Although not required by the invention, the elimination of invalid intermediate code matches between identical back-to-back code-words is very desirable in a stylus telemetry system because there are long operational periods in such systems where the stylus telemetry data is unchanging, such as when the stylus 12 is lying idle. During such periods, the stylus 12 transmits long chains of identical back-to-back code-words and the rejection of invalid intermediate code matches is very important.

It should be appreciated that although the coding scheme described above has a low probability of creating invalid intermediate matches, such matches will occasionally occur. It should also be appreciated that bit errors occurring in the transmission of code-words between the stylus 12 and the host computer 18 may increase the probability of invalid intermediate matches occurring in the data stream received by the host computer 18. As will be described shortly, the invention provides a synchronization scheme for detecting validly transmitted code-words while rejecting invalid intermediate matches.

As described above, the encoder 42 receives the 21-bit code-words from the MIU 40 and further encodes them. In the preferred embodiment of the present invention, the encoder 42 provides Manchester encoding to the code-words. Manchester encoding involves inverting each bit of a code-word and inserting that inverted bit into the code-word right after the original bit. Manchester encoding, therefore, increases the length of the code-words from 21 bits to 42 bits, although the information content of the signal remains at 21 bits. In the context of the present invention, Manchester encoding is useful for a number of different reasons. A first reason is that Manchester encoding provides DC balance to the signal being transmitted by the stylus 12. This DC balance is desirable because, among other things, the receiver in the host computer may perform mathematical integration on the received signal, a function which is greatly affected by a signal having a varying DC level.

A second reason that Manchester encoding is useful is that it provides a code constraint to the 21-bit code-word. This code constraint ensures that a maximum of two logic zeros will occur between any two logic ones. Without some form of code constraint, the host computer 18 would not be able to synchronize to the data stream received from the stylus 12. This is because a random data stream could, theoretically, contain a large number of successive logic zeros and hence provide no timing data to the host computer 18 from which a clock could be derived. It should be appreciated that the encoder 42 may utilize any run length limited (RLL) code which is capable of producing standard length data packets given code-words of a predetermined length. For convenience, however, the balance of the specification will assume Manchester encoding is being used.

After the code-words have been Manchester encoded, they are delivered to the modulator 44 where they modulate a carrier signal produced by the oscillator 46. In the preferred embodiment, the carrier signal is a sinusoidal wave having a frequency of 125 MHz which is mixed with the Manchester encoded data stream in the modulator 44. Other forms of modulation may also be used. After the code-words have modulated the carrier signal, they are delivered to and transmitted from the stylus tip 14 in a continuous, homogeneous data stream.

As previously described, the signal transmitted from the stylus tip 14 is induced into the surface 17 of the graphics tablet 16 which is coated with a resistive material. The signal creates a current in the coating which flows outward from the point on the surface 17 which is closest to the stylus tip 14 toward the four corners A, B, C, D of the tablet 16. At the corners, the current is divided between four conductors, each being connected to the integrated circuit 20 of the host computer 18. The integrated circuit 20 compares the amplitudes of the four currents to determine the location of the stylus tip 14 with respect to the tablet 16. The integrated circuit 20 then further processes the currents to detect the telemetry data encoded in the signal.

Figure 5:
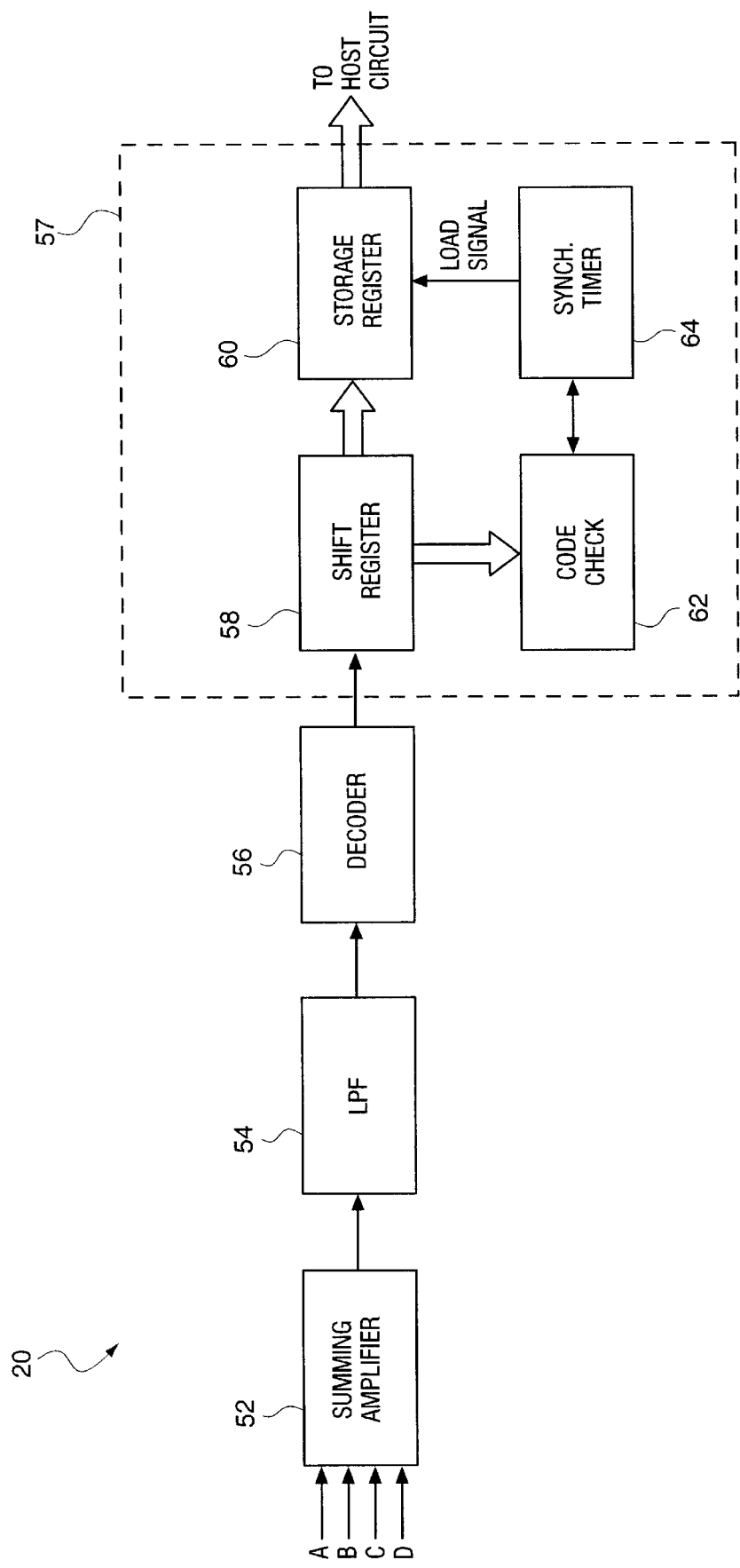
FIG. 5 is a block diagram illustrating one embodiment of the integrated circuit 20 of FIG. 1 configured in accordance with the present invention.

FIG. 5 is a block diagram illustrating one embodiment of the circuitry comprising integrated circuit 20. For convenience, the stylus tip location circuitry has been omitted from FIG. 5. As seen in the figure, the integrated circuit 20 may include: a summing amplifier 52; a low pass filter 54; a decoder 56; and detection circuitry 57 including: a shift register 58, a storage register 60, a code checking unit (CCU) 62, and a synchronization timer 64. The summing amplifier 52, the LPF 54, and the decoder 56, in combination, are operative for converting the RF currents from the four corners A, B, C, D of the tablet 16 into a continuous data stream of back-to-back 21-bit code-words. The detection circuitry 57 is operative for receiving the data stream from the decoder 56 and for separating out the valid code-words while rejecting invalid intermediate matches. The valid code-words may then be transferred to other circuitry within the host computer 18 where error detection/correction may be performed or where the telemetry data may be utilized to perform various applications.

The summing amplifier 52 is operative for receiving the currents from the four corners A, B, C, D of the tablet 16 and for adding the four current signals to produce a single composite RF signal. This composite RF signal is delivered to the low pass filter (LPF) 54 which removes the carrier component of the signal, leaving a continuous, homogeneous data stream of back-to-back Manchester encoded code-words which is input to the decoder 56. Although not shown in FIG. 5, this data stream may also be separately input into a timing recovery circuit for deriving a clock signal to synchronize the remaining circuitry in the integrated circuit 20 to the incoming data stream. The decoder 56 receives the data stream from the LPF 54 and removes the Manchester encoding, resulting in a continuous, homogeneous data stream of back-to-back 21 bit code-words. The data stream from the decoder is then serially shifted into the shift register 58 one bit at a time.

The CCU 62 continuously monitors the data stream being shifted through the shift register 58 to detect when any 21-bit "frame" of the data stream matches a valid 21-bit code word. When a first match is detected, the CCU 62 informs the synchronization timer 64 and then continues to monitor the input data stream as before. In response, the synchronization timer 64 signals the storage register 60 to load the matched code word for delivery to the host. The synchronization timer 64 also resets an "insync" qualifier flag, which indicates that the current match is not synchronized. This qualifier is also sent to the storage register 60 for delivery to the host.

When the CCU detects the next match, it again informs the synchronization timer 64 which checks to see if this match occurred 21 bit times after the beginning of the previous match. If the latter match did not occur 21 bit times after the previous match, then the "insync" qualifier flag remains in a reset condition, the matched code word and the "insync" qualifier value are delivered to the host, and the CCU 62 continues to monitor the input data stream as before. If the latter match did occur 21 bit times after the previous match, the detection circuitry 57 is said to be "synchronized" to the incoming data stream and the "insync" qualifier flag is set. The matched code word and the newly set "insync" qualifier value are then delivered to the host.

After synchronization occurs and the "insync" qualifier flag is set, the synchronization timer 64 instructs the CCU 62 to ignore the next 20 "frames" of the input data stream being shifted through the shift register 58 and to next check for a code match at the frame beginning 21 bit times after the beginning of the last detected match. If this frame is a match, then the detection circuitry 57 remains synchronized and the "insync" qualifier flag remains set. From this point on, as long as each frame beginning 21 bit times after the beginning of a previous match is a match itself, the detection circuitry 57 remains synchronized and the "insync" qualifier flag remains set.

Upon receiving each detected code word and its corresponding "insync" qualifier flag, the host can decide to reject code words which are not synchronized. Use of the above synchronization method greatly reduces the probability of mistaking an invalid intermediate match for a validly transmitted code-word, for any given coding scheme. In the preferred embodiment of the present invention, the CCU 62 is implemented using exclusive-OR (XOR) tree circuitry.

It should be appreciated that the number of consecutive back-to-back code matches that are required before the detection circuitry is considered synchronized is variable and that the above description is not meant to limit this number to two. For example, as more telemetry data is added to the data portion of the 21-bit code word, a requirement of three or more consecutive code matches may be needed to ensure successful rejection of invalid intermediate code matches. Also, requiring a larger number of consecutive code matches before synchronization may allow the use of a less robust, and therefore less complicated, coding scheme.

Although the present invention has been described in conjunction with its preferred embodiment, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. The method, as claimed in claim 1, wherein:
said step of selecting a code includes selecting a code based on the probability that invalid, intermediate matches will be formed between back-to-back code-words.

2. The method, as claimed in claim 1, wherein:
said code-words include a data portion and a code portion.

3. The method, as claimed in claim 2, further comprising the step of:
further encoding said code-words using a code which imparts timing information to said continuous stream of packets.

4. The method, as claimed in claim 2, wherein:
said selected code includes one of the following: an error detecting code and an error correcting code.

5. The method, as claimed in claim 4, further comprising the steps of:
detecting errors in said code-words after said step of separating; and
rejecting code-words which contain errors.

6. The method, as claimed in claim 2, wherein:
said step of encoding includes encoding said input data words using a shortened (23,12) Golay code which may be generated using a $5343_8$ generator polynomial.

7. The method, as claimed in claim 6, wherein:
said step of encoding further includes inverting a portion of said Golay coded data words using a $3775_8$ inversion which comprises inverting every bit of said portion except a second to last bit.

8. The method, as claimed in claim 2, wherein:
said step of transmitting said code-words includes modulating a carrier signal using said continuous stream of packets and emitting said modulated carrier signal from said stylus.

9. The method, as claimed in claim 8, wherein:
said step of receiving includes receiving said modulated carrier signal from said stylus and removing said carrier signal component to produce said continuous stream of packets.

10. The method, as claimed in claim 2, wherein:
said step of separating said continuous stream of packets includes the step of recognizing valid code-words in said continuous stream of packets.

11. The method, as claimed in claim 10, wherein:
said step of recognizing valid code-words in said continuous stream of packets includes the step of only checking certain positions in said continuous stream of packets for a valid code-word after a predetermined number of valid code-words have been recognized at specific positions in said stream of packets, to effectively reject invalid intermediate code-matches.

12. The method, as claimed in claim 10, wherein:
said step of separating said continuous stream of packets further includes the step of qualifying each recognized valid code-word based on whether a predetermined number of valid code-words have been recognized at specific positions in said stream of packets.

13. The method, as claimed in claim 1, further comprising the step of:
further encoding said code-words using a code which creates a DC balanced stream of packets.

14. The apparatus, as claimed in claim 1, wherein:
said encoding means includes a linear feedback shift register circuit.

15. The apparatus, as claimed in claim 1, wherein:
said means for separating includes exclusive-OR tree circuitry.

16. The stylus, as claimed in claim 1, wherein:
said means for encoding further includes means for inverting a portion of each of said Golay coded data words using a $3775_8$ inversion which comprises inverting every bit of said data words except a second to last bit.

17. In a computer system having a stylus that delivers telemetry data to a host computer via a continuous, uninterrupted stream of back-to-back code-words, an apparatus for receiving said continuous, uninterrupted stream of back-to-back code-words from said stylus and for accurately separating said code-words for use by said host computer, said apparatus comprising:

code checking means for monitoring said continuous, uninterrupted stream of back-to-back code-words and for detecting the occurrence of bit strings in said stream which match valid code-words; and synchronization means for qualifying detected bit-strings which match valid code-words based on whether a predetermined number of bit-strings have been detected by said code checking means at specific positions in said continuous stream of back-to-back code-words, said qualified detected bit-strings being output for use by said host computer.

18. The apparatus, as claimed in claim 17, wherein: said synchronization means further comprises:

means for instructing said code checking means to only check for the occurrence of bit strings which match valid code-words at certain positions in said continuous stream of back-to-back code-words after a predetermined number of bit strings which match valid code-words have been detected at specific positions in said stream, to effectively reject invalid intermediate code-matches.

\* \* \* \* \*